United States Patent [19]
Reeves et al.

[11] 3,751,765
[45] Aug. 14, 1973

[54] FISH SCALER DEVICE
[76] Inventors: Billy Joe Reeves, Campbellton Hwy.;
James L. Chancey, 1111 Martin St.,
both of Dothan, Ala.
[22] Filed: June 21, 1971
[21] Appl. No.: 154,915

[52] U.S. Cl. .................................................. 17/64
[51] Int. Cl. ............................................ A22c 25/02
[58] Field of Search ...................... 17/64, 65; 43/55

[56] References Cited
UNITED STATES PATENTS
3,233,279  2/1966  Edgar........................................ 17/64
2,111,959  3/1938  Baxter........................................ 43/55
3,178,764  4/1965  Herbert et al. ........................... 17/64

Primary Examiner—Lucie H. Laudenslager
Attorney—Watson, Cole, Grindle & Watson

[57] ABSTRACT

A floatable fish scaler device and method of automatically removing scales from fish by means of water pressure as the device is towed through the water, including a cylindrical and rotatable water-permeable fish basket, a floatable nose cone at the forward end of the basket and a floatable rear cone at the rearward end of the basket having outer impeller blades thereon for imparting rotation to the device as it is towed through the water.

4 Claims, 4 Drawing Figures

PATENTED AUG 14 1973   3,751,765

INVENTORS,
BILLY JOE REEVES
JAMES L. CHANCEY

BY Watson, Cole, Grindle & Watson
ATTORNEYS

FISH SCALER DEVICE

This invention relates generally to a floating fish scaler device and method of scaling fish, and more particularly to such a device and method for automatically scaling fish by water pressure and, at the same time, being usable as a live fish box while fishing as well as a fish basket for transporting both scaled and unscaled fish.

Numerous means have been devised in the past for either assisting the fisherman in removing scales as well as entrails from fish either manually or automatically. To this end, fish scaler cage-like devices have been developed which rotate while being towed through the water behind the fisherman's boat, such devices relying on inwardly projecting sharp edges for removing the scales as the fish contact these edges while tumbling about in the cage. These devices have, however, proven not entirely satisfactorily because the cutting edges only tend to damage the flesh or the fins of the fish if the fish scaling operation is not closely controlled.

Accordingly, one of the principal objects for the present invention is to provide a floatable fish-scaling device and method of automatically and conveniently removing scales from the fish by means of water pressure as the device is towed by the fisherman's boat after he has made a catch. The inner organs may also be removed after the fish are split open along their stomachs, and other undesirable parts of the fish are removed by the pressure of the water passing through a water permeable cylindrical fish container.

Another object of the present invention is to provide such a fish scaling apparatus wherein the cylinder is rotated as it is towed by the fisherman's boat, the wall of the cylinder having openings therein of a sufficient size to permit the removed scale and entrails of the fish to conveniently pass therethrough, the device further including floatable nose and rear cones secured to the container, impeller blades being provided on the rear cone to impart rotation to the container, and closure means being located on the container wall to permit loading and unloading of the fish.

A further object of this invention is to provide such a fish scaler device wherein the rear cone projects inwardly of the container so as to increase water pressure within the container and to enhance passage of the removed scales and entrails through the container openings.

A still further object of this invention is to provide such a fish scaler device wherein the nose cone projects forwardly of the forward end of the container and is provided with a swivel hook thereon to permit attachment of the device with a tow line.

A still further object of the present invention is to provide such a fish-scaler device wherein the inner wall of the closure means as well as the inner wall of the container are smooth to thereby avoid any damage to the fish during scale and entrail removal.

Other objects, advantages and novel features of the present invention will become apparent from the following detailed description of the invention when considered in conjunction with the accompanying drawings wherein.

Figure 1:
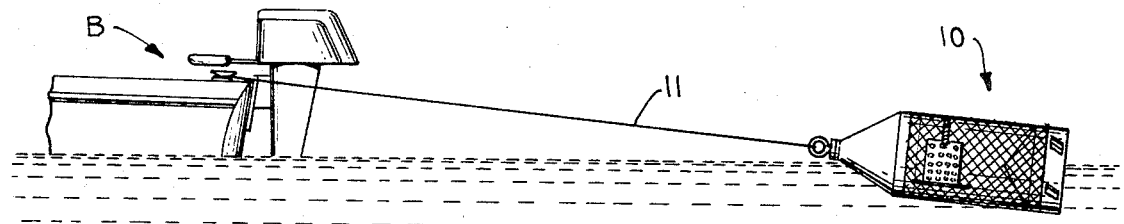
FIG. 1 is a view in side elevation showing the fish scaler device in accordance with the present invention and the manner in which it is towed behind a moving boat.
Figure 2:
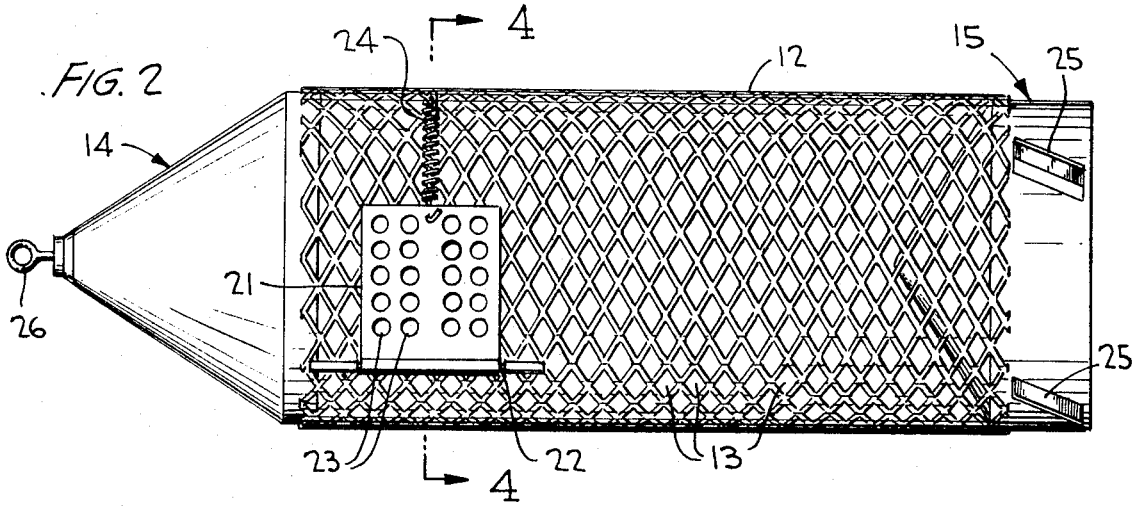
FIG. 2 is a side elevational view of the fish-scaler device slightly enlarged as compared to the FIG. 1 showing.
Figure 4:
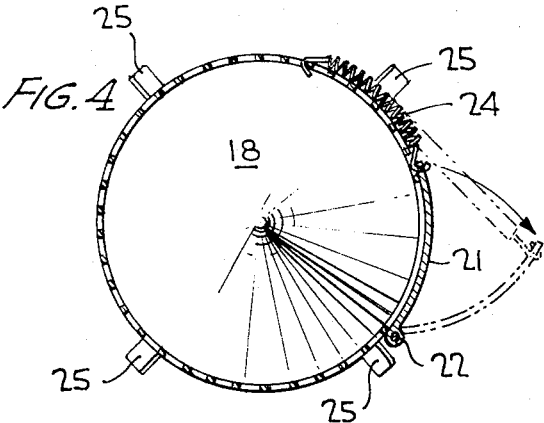
FIG. 4 is a transverse sectional view of the fish-scaler device taken along the line 4—4 of FIG. 2.

Turning now to the drawings wherein like reference characters refer to like and corresponding parts throughout the several views, there is shown in FIG. 1 a fish scaler and cleaning device 10 interconnected to a moving boat B by means of a tow line 11 so as to be towed through the water by the moving boat. The remaining figures show the various details of the present floatable fish-scaler device as comprising a water permeable cylindrical fish container 12 having a smooth inner surface, as shown in FIG. 4, and being constructed of expanded metal. The openings 13 defined by the expanded metal container are sufficiently large so as to permit the removed scales and entrails of the fish to pass outwardly therethrough after being removed in a manner to be hereinafter described.

Figure 3:
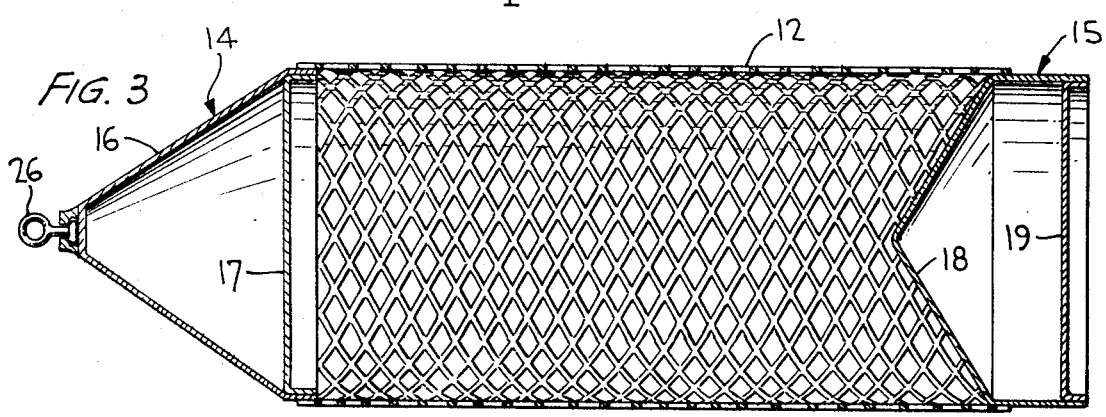
FIG. 3 is a longitudinal sectional view of the fish-scaler device of FIG. 2.

The scaler and cleaning device 10 further includes a nose cone 14 welded or otherwise secured to the forward end of container 12, and a rear cone 15 also welded or otherwise secured to the rearward end of the container. The forward nose cone 14 comprises a conical plate 16 completely enclosed at its rearward end by means of a circular plate 17. Also, the rear cone 15 comprises a conical plate 18 completely enclosed at its rearward end by means of a circular plate 19. As seen clearly in FIG. 3, the major diameter of each conical plate 16 and 18 is substantially equal to the diameter of container 12 so as to be snugly fitted therewithin. Also, the completely enclosed nose and rear cones are completely sealed and watertight to thereby act as floats for the device so that the fish scaler may be conveniently used as a live fish box while fishing as well as to buoy up the device to some extent while it is being towed behind the boat.

A closure means in the form of a door 21 is hingedly mounted on the wall of container 12 by means of a hinge pin 22, the door having a plurality of openings 23 therein and a smooth inner surface as shown in FIG. 4. The door may be opened in an outward direction against the force of a coil spring 24 which is attached at one end of the wall of container 12 and at its other end to the free end of the door. The open position of the door is shown in phantom in FIG. 4.

Impeller blades 25 are mounted along the periphery of conical plate 18, extend radially therefrom and are disposed in a slightly inclined relationship to the longitudinal axis of the device. These blades therefore serve to conveniently and effectively, and without the assistance of outside power, impart rotation to the container as it is being towed through the water.

The tow line 11 is prevented from being entangled or twisted by means of an eye-hook 26 swivelably mounted at the tip end of conical plate 16. By reason of the cone-shaped nose 14, this pulling end will always be maintained in an upwardly inclined position thereby causing the device to rise to the surface whenever it is being towed and rotated through the agency of the impeller blades 25.

In order to scale the caught fish, the fisherman simply loads the container through the door 21, starts the boat motor and increases its speed thereby towing the device behind it. As it rotates and moves through the water, a constant flow of water pressure will be maintained throughout the container against the sides of the fish tumbling about therein whereby the scales will not only be removed therefrom but the fish flesh will be automatically washed without any damage thereto by reason of the smooth inner surface of both the container and the door. The container therefore serves mainly as a fish basket and does not function as a fish scaler per se since it is devoid of any sharp inwardly projecting blades or cutting surfaces. It has been found that the boat may speed up to 25 miles per hour and, after having moved a distance of one-half to three-quarter miles depending on the number of fish in the container, the scales are completely removed and the fish flesh washed. These removed scales simply pass through the openings 13 of the container wall as they are being removed and, by reason of conical plate 18 projecting inwardly of the rearward end of container 12, serves to insure that all the removed scales pass outwardly of the container.

If desired, the fish may be slit before being loaded within the container so that not only the fish scales but also the entrails will be removed by the water pressure within the container.

From the foregoing it can be seen that a simple yet highly economical floating fish scaling and cleaning device has been provided for the removal of both fish scales and entrails in a simple and highly effective manner without the danger of damaging the fish flesh in the process by reason of the pressure of the water itself moving through a water permeable container thereby removing the scales and passing them outwardly through the container openings in one clean and remote operation.

Obviously, many modifications and variations of the present invention are possible in the light of the above teachings. For example, the elements comprising the device may be of plastic construction. It is therefore to be understood that within the scope of the appended claims, the invention may be practiced otherwise than as specifically described.

What is claimed is:

1. A floating fish-scaler device capable of being towed in a forward direction while floating along the surface of a body of water, comprising:

a perforate cylindrical fish container having a smooth inner surface;

a floating, water-tight forward nose cone fixedly secured to one end of said container, said nose cone comprising an imperforate conical plate and an imperforate bottom plate, said imperforate conical plate extending in a forward direction from said container one end thereby causing said container to be maintained in an upwardly inclined position slightly out of the water at said one end while being towed along the surface of the water;

means at the forward end of said conical plate for securing a tow line to the device;

a floating, water-tight rearward cone fixedly secured to the opposite end of said container, said rearward cone comprising an imperforate plate and a bottom plate, said rearward cone imperforate plate having a conical section and a cylindrical section substantially equal in diameter to the diameter of said cylindrical container, said conical section extending in a forward direction from said opposite end toward said nose cone, and said cylindrical section extending in a rearward direction from said opposite end away from said nose cone;

closure means on the wall of said container through which fish may be loaded into said container and through which the scaled fish may be removed therefrom; and radially projecting impeller blades mounted along the outer periphery of said cylindrical section to impart rotation to said container while it is being towed, said water-tight cones causing the device to float on the water surface and said forwardly extending conical section causing the water within said perforate container to increase in pressure near said container end, this water pressure alone serving to remove the scales from the fish during rotation of said container.

2. The floatable fish-scaler device according to claim 1 wherein said container comprises a sheet of expanded metal wherein its openings are sufficiently large to permit the scales removed from the fish to pass outwardly therethrough.

3. The floating fish-scaler device according to claim 1 wherein said securing means comprises a swivelably mounted eye-hook to permit the device to rotate without entanglement of said tow line.

4. The floating fish-scaler device according to claim 3 wherein said closure means comprises a door plate having openings therein and a smooth inner surface, one end of said door plate being hingedly connected to said container wall, a coil spring interconnecting said door plate with said container wall, whereby said door plate may be open against the action of said coil spring.

* * * * *